United States Patent
Campbell et al.

[11] Patent Number: 6,096,277
[45] Date of Patent: *Aug. 1, 2000

[54] POLLUTANT REMOVAL FROM AIR IN CLOSED SPACES

[75] Inventors: Larry E. Campbell; Michele W. Sanders, both of Knoxville, Tenn.

[73] Assignee: Goal Line Environmental Technologies LLC, Knoxville, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 08/977,464

[22] Filed: Nov. 24, 1997

Related U.S. Application Data

[62] Division of application No. 08/687,059, Aug. 7, 1996, Pat. No. 5,888,924.

[51] Int. Cl.$^7$ ................................. C01B 13/00
[52] U.S. Cl. ................ 423/219; 423/579; 423/581; 95/138
[58] Field of Search ............... 95/138; 423/579, 423/581, 219; 502/527.1; 501/415

[56] References Cited

U.S. PATENT DOCUMENTS

| | | | |
|---|---|---|---|
| 3,682,585 | 8/1972 | Frevel et al. | 423/219 |
| 3,985,683 | 10/1976 | Stenzel | 252/466 J |
| 4,200,609 | 4/1980 | Byrd | 422/122 |
| 4,207,291 | 6/1980 | Byrd et al. | 422/122 |
| 4,343,776 | 8/1982 | Carr et al. | 423/210 |
| 4,405,507 | 9/1983 | Carr et al. | 252/466 B |
| 4,459,269 | 7/1984 | Zackay et al. | 423/219 |
| 4,749,671 | 6/1988 | Saito et al. | 502/64 |
| 5,002,920 | 3/1991 | Yoshimoto et al. | 502/324 |
| 5,063,193 | 11/1991 | Bedford et al. | 502/304 |
| 5,158,654 | 10/1992 | Yoshimoto et al. | 204/59 R |
| 5,160,586 | 11/1992 | Yoshimoto et al. | 502/59 R |
| 5,212,140 | 5/1993 | Yoshimoto et al. | 502/300 |
| 5,232,882 | 8/1993 | Yoshimoto et al. | 502/2 |
| 5,422,331 | 6/1995 | Galligan et al. | 502/333 |

FOREIGN PATENT DOCUMENTS

| | | |
|---|---|---|
| 270678 | 5/1963 | Australia . |
| 78640 | 5/1985 | Japan . |

*Primary Examiner*—Tom Dunn
*Assistant Examiner*—Cam N. Nguyen
*Attorney, Agent, or Firm*—Kenneth H. Johnson

[57] ABSTRACT

A catalyst system useful at room temperature for the destruction of ozone ($O_3$), which is comprised of a washcoat of high surface area support containing Mn/Cu catalyst deposited on a macroporous carrier, such as a honeycomb monolith, optionally with the addition of noble metal (such as Pt) washcoat to remove carbon monoxide.

9 Claims, 11 Drawing Sheets

6,096,277

POLLUTANT REMOVAL FROM AIR IN CLOSED SPACES

This is a division of application Ser. No. 08/687,059 filed Aug. 7, 1996, now U.S. Pat. No. 5,888,924 issued Mar. 30, 1999.

BACKGROUND OF THE INVENTION

1. Field of the Invention

The present invention relates to a catalyst, catalyst system and apparatus to purify air in closed spaces such as rooms, vehicles, office buildings, and the like and in particular to a catalyst for ozone remediation at "room temperature".

2. Description of Related Art

Air purifiers for use in homes, sick rooms, offices and closed atmosphere buildings are known. These purifiers remove odors and in some cases introduce ozone or other material to oxidize impurities in the air. U.S. Pat. No. 5,422,331 discloses a catalytic metal oxide deposited over an undercoat of a mixture of a fine particulate metal oxide and a solution for removing ozone in air plane cabins or other closed areas. U.S. Pat. No. 4,405,507 discloses a precious metal ozone decomposition catalyst containing a platinum Group metal and a Group VIII metal oxide in closed spaces.

The present invention provides a catalyst and a system and method using the catalyst for the remediation of atmospheric ozone and/or carbon monoxide at "room temperature". It is a particular advantage that the present catalyst and the system may be used with existing particulate air filtration equipment. It is a feature of the present invention that it may also be adapted to remove CO from air concurrently with the ozone removal.

SUMMARY OF THE INVENTION

Basically the present invention is a catalyst component and a catalyst system comprising a carrier having the catalyst component deposited thereon useful for the reduction of ozone in air, the process of making the catalyst components and the catalyst system and the process of using the catalyst system to remediate air. The catalyst component comprises a combination of a manganese component and a copper component applied to a high surface area support and the catalyst system comprises the catalyst component applied to a carrier. The manganese and copper components are usually present as oxides or hydroxides in use, e.g $MnO_2$, $Cu(OH)_2$ and $CuO$. The manganese component comprises 2 to 50 weight % of the catalyst component and the copper component comprises 1 to 40 weight % of the catalyst component, preferably 5 to 25 wt. % manganese as $MnO_2$ and 2.5 to 15 wt. % copper as $Cu(OH)_2$. The catalyst component comprises 5 to 20 wt. % of the total weight of the carrier and catalyst component.

In addition to the ozone reduction components other components may be added to the catalyst to remove CO, $NO_x$, and the like. A noble metal component comprising a noble metal applied on a high surface area support and applied on the carrier may be added to remove CO. The preferred noble metal is a platinum. The noble metal may comprise from about 0 to 20 wt. % of the catalyst component measured as the metal. A catalyst system containing both the Mn/Cu component and the noble metal preferably is coated with an absorber. It is believed that the absorber frees the noble metal component molecules from the CO reaction products by absorbing the reaction products away from the noble metal component. The noble metal component comprises 0.1 to 5.0 wt. % of the total weight of the carrier and added components (catalyst component and noble metal component and any others).

A separate apparatus from an existing filtering system may be used which comprises a catalyst component, means to move air over the catalyst component and preferably a heater to control the air temperature. The catalyst component can be mounted in a canister or mounted integrally with a space heater and/or air conditioner.

The term "room temperature" is used herein to include temperatures in the range of 50–120° F. The ozone may be present in only trace amounts, i.e. 50 to 1000 ppb, which is in general the operating range for which the present catalyst system is designed. Carbon monoxide is also present in trace amounts, e.g. 0.1 to 100 ppm.

DETAILED DESCRIPTION

Figure 1:
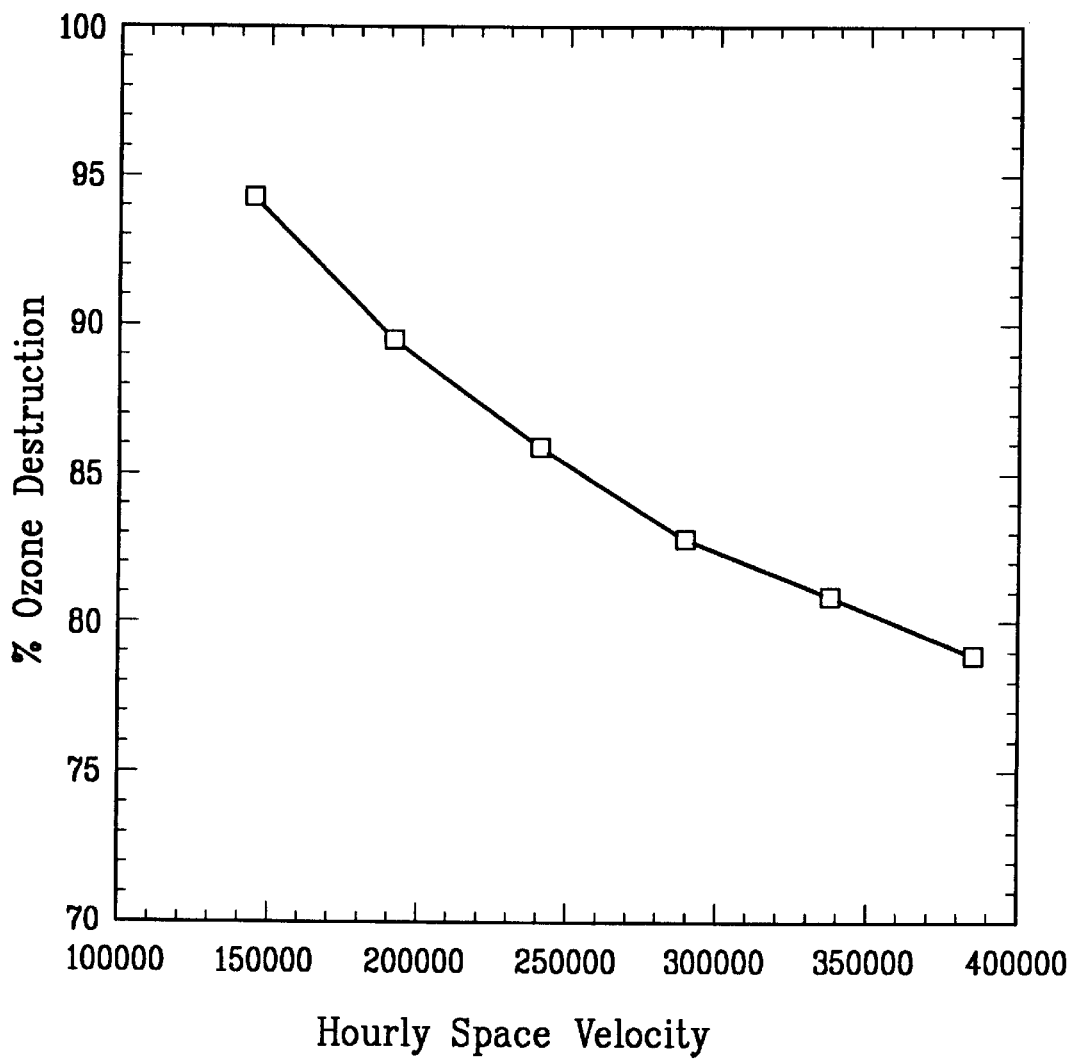
FIG. 1 is a graph showing % of ozone destruction for a 0.78 g./in$^3$ Mn/Cu catalyst component on a 400 cpsi honeycomb (monolith)—500 ppb ozone at 75° F.

The catalyst system herein described is especially useful at room temperature in commercially available room air cleaners for the destruction of ozone ($O_3$). With the addition of noble metal e.g., as a washcoat to the base metal washcoat (Mn/Cu), carbon monoxide is also destroyed but at a slower rate. The preferred noble metal is platinum. The equations for the oxidation of ozone to oxygen and carbon monoxide to carbon dioxide are:

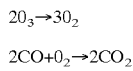

The base metal washcoat may be prepared by applying a solution of cupric nitrate ($Cu(NO_3)_2$) and potassium permanganate ($KMnO_4$) to high surface area alumina powder by the method of incipient wetness. The copper and manganese compounds can be reduced and/or precipitated with a solution of a carbohydrate such as sucrose. The powder is washed to remove potassium hydroxide and then milled with dilute acetic acid into a high surface area catalytically active washcoat. The copper component and manganese component may be applied to the carrier in any order, however concurrent deposition is preferred.

The noble metal washcoat may be prepared by applying a solution of an aqueous platinum salt to high surface area alumina powder by the method of incipient wetness. The powder is fired at 500° C. to volatilize contaminants such as organic residuals and interstitial water. The powder is then milled with dilute acetic acid into a high surface area catalytically active washcoat. The noble metal washcoat can also be made by applying the aqueous $Pt(OH)_6$ solution to the catalyst system after the alumina washcoat has been deposited on the support structure. The noble metal washcoat may be applied in order to the carrier, although it is preferred to deposit it concurrently with the Cu/Mn components.

The high surface area support is made of alumina, zirconia, titania, silica or a combination of two or more of these oxides. Preferably, the high surface area support is made of alumina. The surface area of the support is in the range of 50 to 350 square meters per gram, preferably 100 to 325 square meters per gram, and more preferably 100 to 200 square meters per gram.

The composition of the ceramic carrier can be any oxide or combination of oxides. Suitable oxide supports include the oxides of Al ($\alpha$-$Al_2O_3$), Zr, Ca, Mg, Hf, and Ti.

The structure and composition of the carrier is of great importance. The carrier structure affects the flow patterns through the catalyst system which in turn affects the transport to and from the catalyst surface and thus the effectiveness of the catalyst. The carrier should be macroporous with 100 to 600 pores per square inch (30 to 80 pores per linear inch). The pores should yield a tortuous path for the reactants and products such as is found in foam ceramics (generally understood to include honeycomb structures). Straight channel extruded ceramic or metal monoliths yield suitable flow dynamics only if the pore size is very small with greater than 14 pores per linear inch.

Ceramic honeycomb is the preferred catalyst carrier because it is a high surface area material that is easy to coat, it has a low pressure drop in the air stream of the room air cleaner and it is available in a variety of cell counts per square inch. The honeycomb is preferably made from cordierite and is coated with the catalytically active washcoat and placed inside a room air cleaner. It is preferably placed in the air intake after all filters or after the electrostatic precipitator. The catalyst removes ozone from the air in the room by oxidation to oxygen.

The catalyst system may be in a shape such as a sphere, solid cylinder, hollow cylinder or sheet.

The catalyst system incorporating a noble metal for CO removal preferably is coated with at least one alkali or alkaline earth compound, which can be hydroxide compound, bicarbonate compound, or carbonate compound, or mixtures of hydroxides and/or bicarbonates and/or carbonated compounds. Preferably, the absorber comprises substantially all carbonate, and most preferably sodium carbonate, potassium carbonate or calcium carbonate. The absorber is disposed on the material at a concentration in the range of 0.5 to 20 percent by weight of the material, preferably 5.0 to 15 percent by weight of the material, and most preferably about 10% percent by weight of the material.

Ozone may be created by high voltage discharges, e.g. lightening and high voltage electronic circuitry, which is present in copying and facsimile machines and cathode ray tubes used in computer and television sets. The present ozone catalyst system may be placed inside the electronic equipment that actually creates ozone. Other applications would include places where this equipment is used such as offices, mailrooms, copying rooms, schools, hospitals, nurseries and day care centers, private homes, toll booths submarines, cars, buses or any closed in space where ozone may originate or buildup.

The design of the apparatus to present polluted air to the CO and $O_3$ destruction system should contain a high efficiency filter to remove particulates. Since the catalyst operates at such a low temperature, the catalyst surface is susceptible to fouling by dust which tends to cling to the catalytic surface area. Since such particulates can be an irritant to the respiratory system their removal is an added benefit.

These catalysts can operate in a fashion to achieve very high destruction efficiencies in a single pass. Such a design would use a relatively large amount of catalyst and can be expensive. In order to make a cost effective destruction system, smaller amounts of catalyst can be used with subsequent lower conversion per pass but which can achieve overall high efficiency destruction by recirculating the room air. The minimum single pass destruction efficiency is determined by the size of the fan or blower required to move the air and the room size. For example, if the fan is rated at 250 standard cubic foot per minute then the air in a 1000 cubic foot room is recirculated 15 times in an hour. In this case 99.5% of the room pollutants would be destroyed in one hour even if the conversion per pass was only 30%. If the room volume were to be 2044 cubic feet the same recirculating air cleaner would have only 7 turnovers per hour and the single pass efficiency would need to be 55% to achieve 99.5% destruction efficiency. The single pass efficiency is determined by the volume of the catalyst employed.

Figure 11:
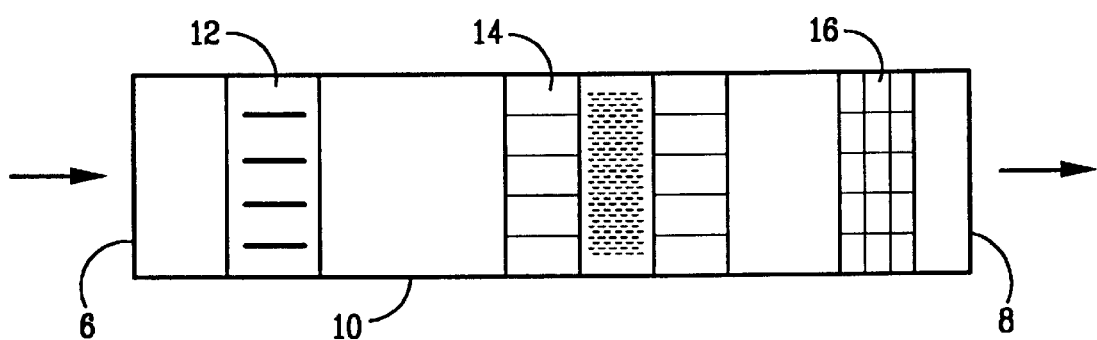
FIG. 11 is a schematic cross sectional elevational view of a filter system using the present catalyst system.

FIG. 11 shows a closed container 10 having the catalyst system containing at least one of the catalyst components (Mn/Cu, noble metal or mixture) supported on a porous carrier 16. The air flow is shown by the arrows from entry 6 to exit 8. Preferably there are one or more filters upstream of the catalyst system. In this embodiment an HEPA filter 14 is preferably immediately upstream and a second, less efficient filter 12 upstream before the other two components.

EXAMPLE 1

A. Catalyst Preparation
  Washcoat preparation
    1. Raw Materials
      a. Deionized Water
      b. Potassium Permanganate
      c. Cupric Nitrate—technical grade; Baker-Mallinckrodt
      d. Alumina, Puralox SCF a-160 -Condea Chemie GmbH (Brunsbuttel, Germany)
      e. Glacial Acetic Acid—99.5% pure technical grade
      f. Octanol
      g. Sucrose—food grade h. Pt(OH)$_6$ aqueous solution—Advanced Catalyst Systems (Knoxville, Tenn.)

2. Washcoat Procedure a. Mn/Cu Catalyst (GLBM) Washcoat

A given weight of Puralox SCF a-160 alumina powder is wetted to the point of incipient wetness (50% of the dry weight of the powder) with a solution of 19.5 wt. % KMnO$_4$ and 4.6 wt % Cu(NO$_3$)$_2$5H$_2$O. After drying at 125° C., the powder is again saturated to the point of incipient wetness with a solution of 10.0% sucrose which reduces the KMnO$_4$ to MnO$_2$ and precipitates Cu(OH)$_2$ when heated to 125° C. The procedure is repeated 2 times more with the same concentration and weight of KMnO$_4$ and Cu(NO$_3$)5H$_2$O solution and heated at 125° C. The powder is now 13.0% MnO$_2$ and 7.5% Cu(OH)$_2$. The dry washcoat powder after preparation is 13.0% manganese dioxide (MnO$_2$) and 6.1% cupric oxide (CuO) on Puralox SCF a-160 alumina powder.

One of the byproducts of the reduction of KMnO$_4$ to MnO$_2$ is KOH. The powder is washed with 0.5% acetic acid to neutralize the KOH and rinsed with deionized H$_2$O to remove KC$_2$H$_3$O$_2$ and any other soluble byproducts. The powder is filtered with medium filter paper to remove as much water as possible and then dried at 125° C. The powder is then milled in a ceramic roller mill one-half full of ceramic milling media with an equal weight plus 10% of 7% acetic acid and a small amount of a defoaming agent, such as octanol, for 8–12 hours at 32 RPM. The resulting suspension has a specific gravity of 1.40, a pH of 4.4 to 4.8 and is approximately 42% solids, which is designated as GLBM catalyst washcoat.

b. Pt Catalyst (GLPM) Washcoat

The GLPM catalyst washcoat is prepared by wetting a given weight of Puralox SCF 1-160 with 5.3% aqueous Pt(OH)$_6$ solution to the point of incipient wetness. The powder is dried at 125° C. and fired at 500° C. to volatilize contaminants and activate the Pt. At this point, the powder is 2.6% Pt.

The powder is then milled in a ceramic roller mill one-half full of ceramic milling media with an equal weight of 7% acetic acid and a small amount of octanol for 12 hours at 32 RPM. The resulting suspension has a specific gravity of 1.46, a pH of 4.3 and is approximately 50% solids, which is designated as GLPM catalyst washcoat.

c. Preparation of catalyst system

For the remediation of both ozone and carbon monoxide, the GLBM and GLPM washcoats are proportionally mixed together by weight and rolled on a roller mill for 1 hour at 32 RPM.

The ceramic honeycomb carrier is Ceclor brand made by Corning (Corning, N.Y.). It is a high surface area material made of cordierite which is magnesium aluminum silicate. The carrier is dipped in the washcoat slowly and allowed to soak for 45 seconds, after which the cells are blown with compressed air to clear them. Approximately 25% of the suspension by weight of the block is used to coat each block. The coated blocks are dried at 125° C. and can be calcined at 300° C. to drive off water and other volatile agents.

B. Test Method

The method used to test the performance of the catalyst system uses a Dasibi 1009-MC Calibration System with ozone generator and a Dasibi 1003-AH ozone analyzer to test for ozone destruction. Carbon monoxide destruction is tested by diluting a compressed gas mixture (0.2% CO in nitrogen) with the Dasibi 1009-MC and analyzing with a Thermo Environmental 48H CO analyzer. The catalyst reactor and all tubing are made of teflon to reduce ozone degradation by the background system. The sample is wrapped with teflon tape to prevent gas bypass and placed inside the teflon reactor. The sample is then exposed to 400 ppb or 100 ppb O$_3$ and/or 10 ppm CO and % O$_3$ and % CO destruction calculated. The sample is tested at different flow rates and vapor hourly space velocity (flow rate/hr/volume catalyst, abbreviated VHSV) is calculated.

C. Evaluations

1. FIG. 1 shows the effect of VHSV on ozone destruction of GLBM catalyst system. As VHSV increases, linear velocity increases, the amount of gas processed increases and the amount of ozone destroyed by the catalyst system decreases. In other words, the catalyst system becomes less effective when the amount of gas that flows through it increases. As flow increases through the catalyst system, the molecules of gas have a shorter residence time, which is the time it takes a molecule to travel through the catalyst system. The target space velocity for a room air cleaner is 300,000 hr$^{-1}$. This balances the cost of the catalyst system with the efficiency of destruction of ozone.

The same catalyst system sample was tested for % CO destruction with 10 ppm CO at room temperature. There was no appreciable destruction of CO.

Figure 2:
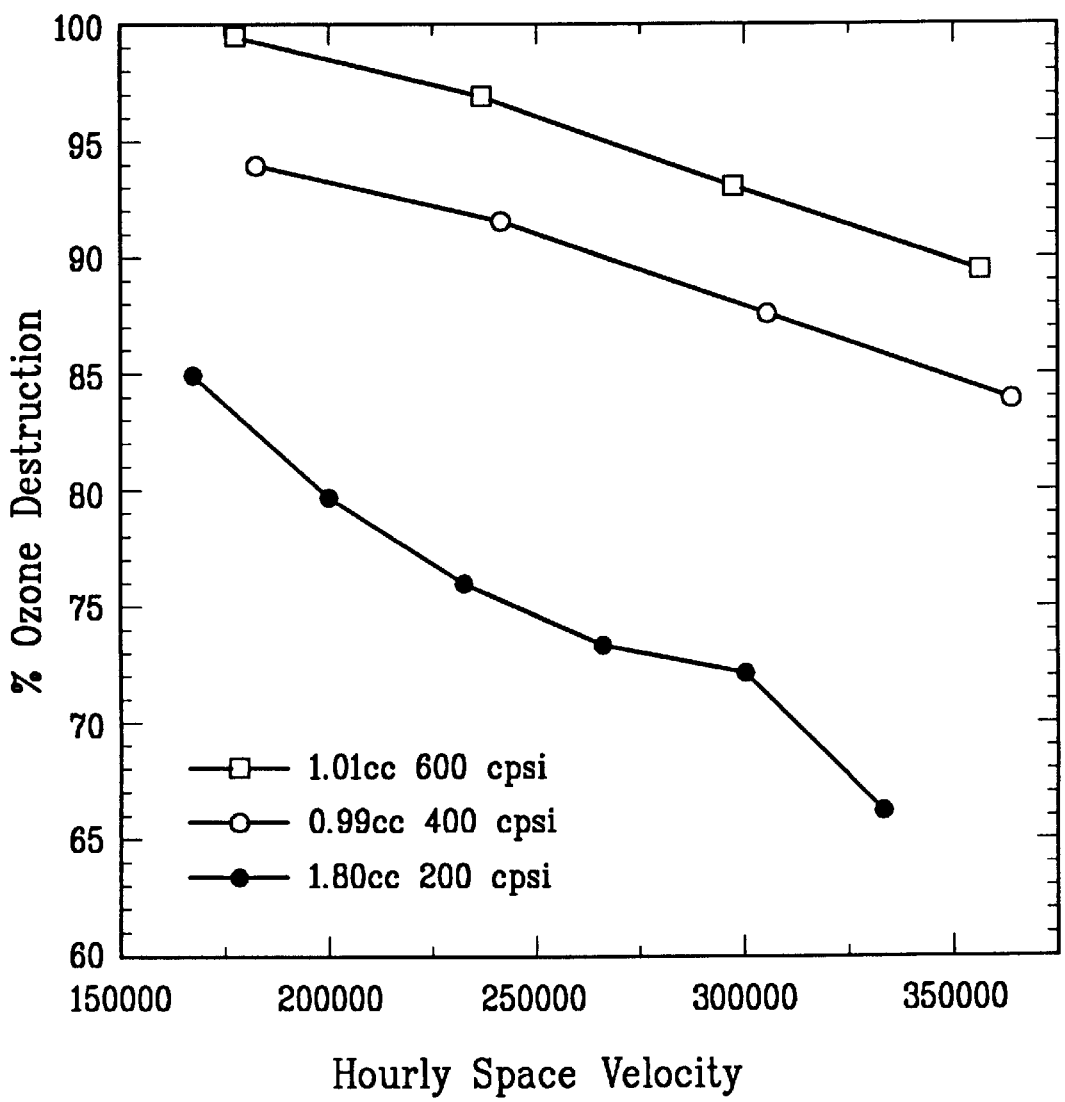
FIG. 2 is a graph comparing various honeycomb cell sizes with Mn/Cu catalyst composition for % ozone destruction—500 ppb ozone at 75° F.

2. Honeycomb blocks with cell counts of 200, 400 and 600 per square inch (cpsi) with GLBM catalyst component were tested for % ozone destruction. FIG. 2 shows that ozone destruction is greatest for 600 cell, and least for 200 cell. The higher cell count provides more surface area for contact with ozone molecules and therefore gives higher ozone destruction efficiency.

400 cpsi honeycomb is presently used for testing purposes because it is readily available in square blocks that can be easily modified to fit the filter area of a room air cleaner. (The 600 cpsi honeycomb is currently available only in a circular shape that will not fit readily into a room air cleaner.) The % ozone destruction of 400 cpsi honeycomb coated with GLBM ozone destruction catalyst is 82% at 300,000 hr$^{-1}$ space velocity.

Figure 3:
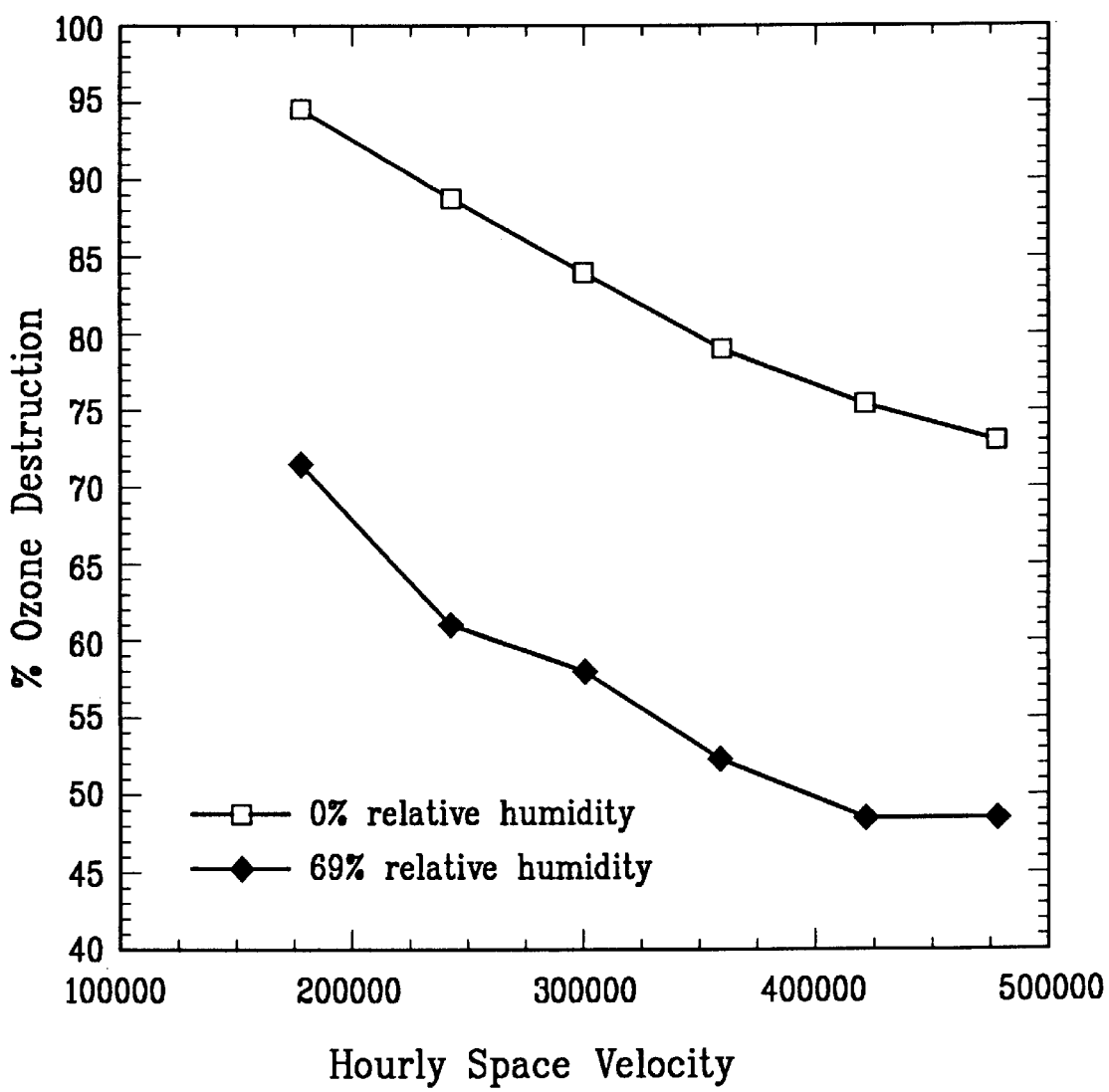
FIG. 3 is a graph comparing 0% relative humidity and 69% relative humidity for % ozone destruction—500 ppb ozone at 75° F., 400 cpsi.

3. The above evaluations were obtained under dry conditions using compressed air from a tank. To simulate the relative humidity (RH) of a room (50–80% RH), the dry air was bubbled through deionized water before it went into the test reactor. This gave a RH of approximately 69%, which is a comfortable level that can be expected indoors during the summer when most pollution levels outdoors go up. FIG. 3 shows the GLBM catalyst effectiveness under dry conditions compared to 69% RH. It was found that relative humidity has a negative effect on the ability of the GLBM catalyst to destroy ozone, 85% effective at 0% RH versus 59% effective at 69% RH, tested at a space velocity of 300,000 hr$^{-1}$.

Figure 4:
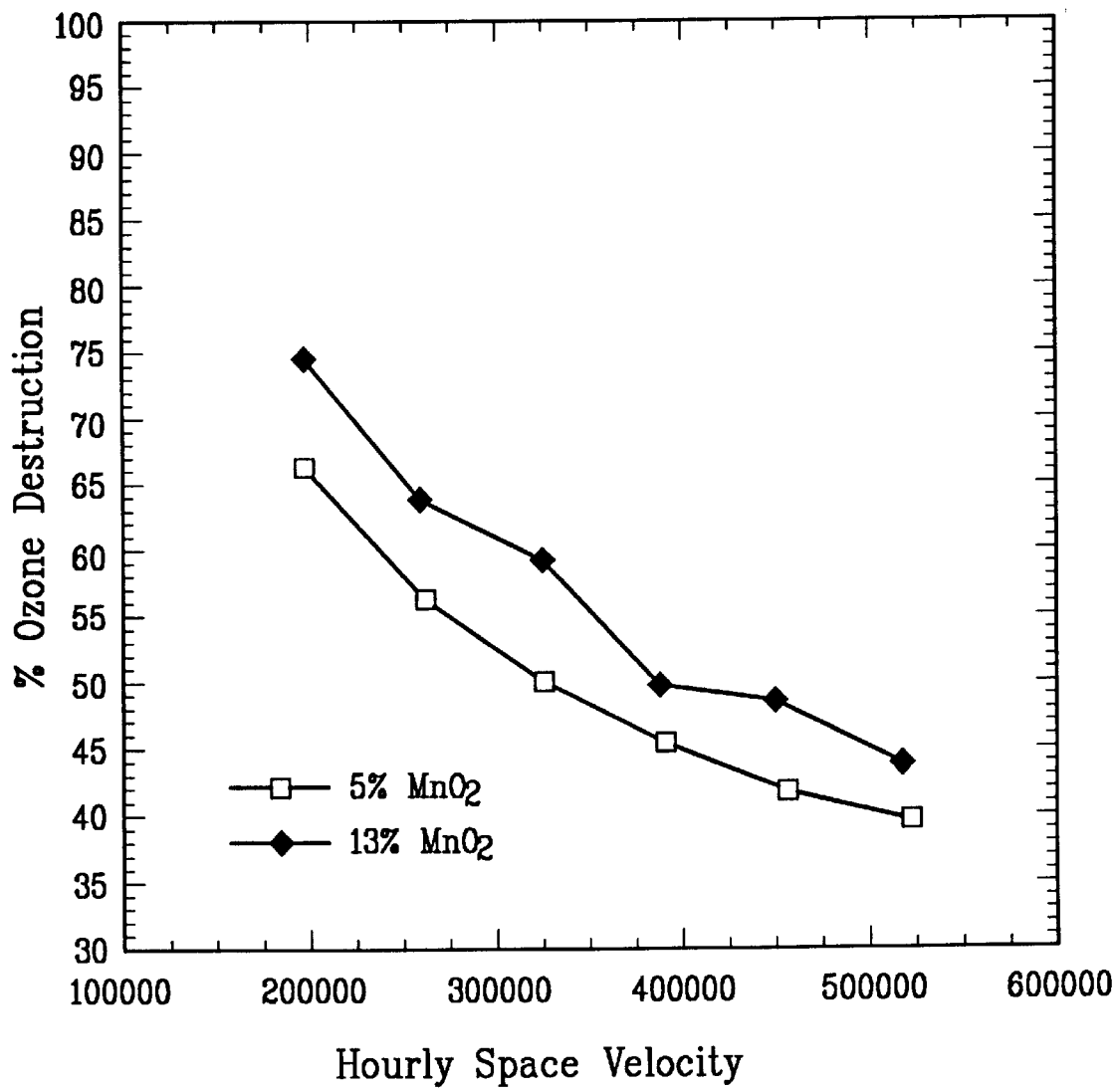
FIG. 4 is a graph comparing $MnO_2$ loading to % ozone destruction—500 ppb ozone at 75° F., 400 cpsi, 69% RH.

4. In this evaluation, alumina powder was prepared with one impregnation of KMnO$_4$ and Cu(NO$_3$)$_2$.5H$_2$O only, reduced, dried and washed, and then prepared into a washcoat. It was 5.1% MnO$_2$ and 1.6% CuO. The test results were compared to test results from a washcoat with 13% MnO$_2$ and 3% CuO, shown in FIG. 4. The 4.1% MnO$_2$ washcoat was 52.5% effective at destroying ozone compared to 61.5% for the 13% MnO$_2$ washcoat, both tested at a space velocity of 300,000 hr$^{-1}$.

Figure 5:
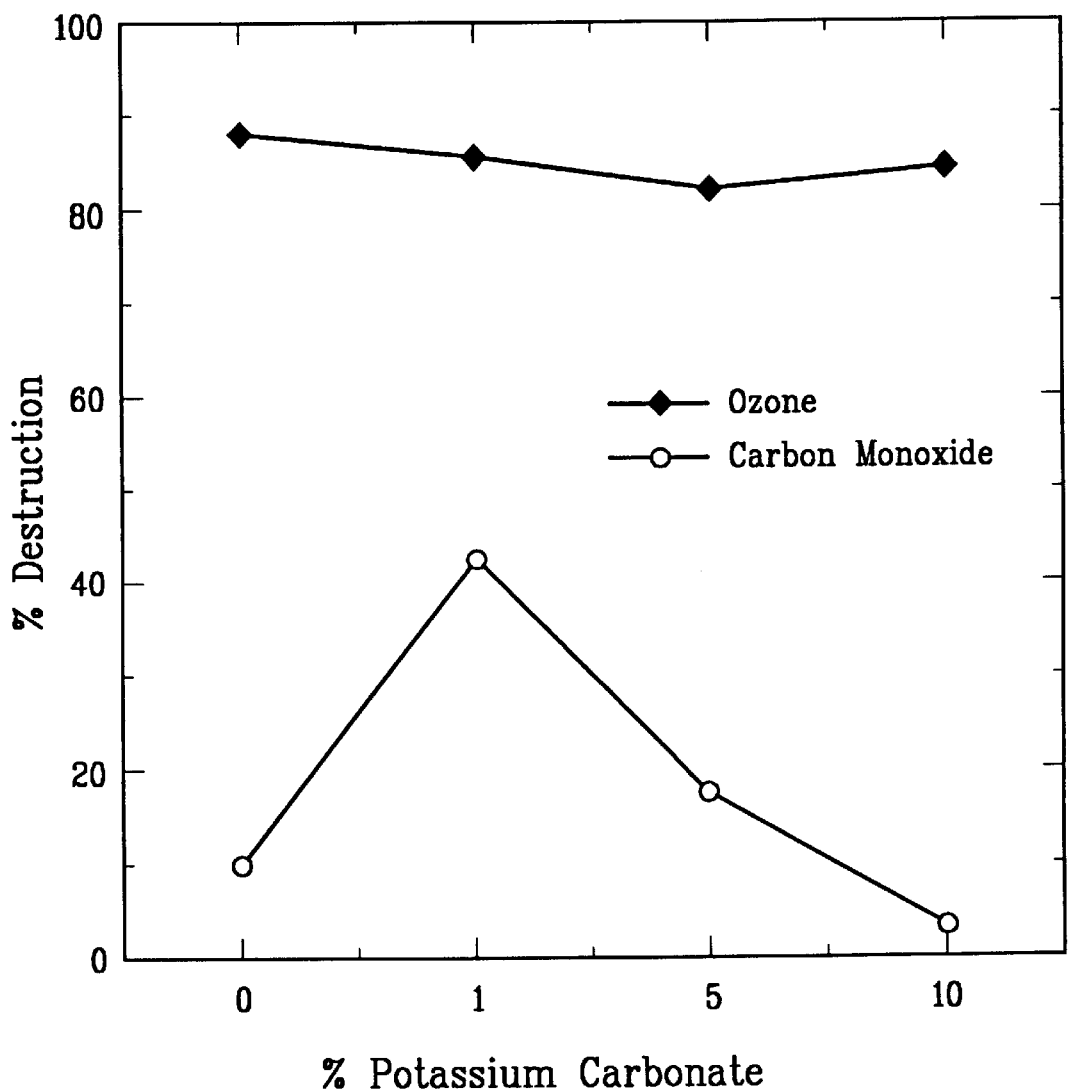
FIG. 5 is a graph comparing % CO destruction at various levels of absorber over Mn/Cu (50%) Pt (50%) deposited on 400 cpsi carrier—265,000 hr$^{-1}$ vapor hourly space velocity (VHSV), 10 ppm CO, 500 ppb ozone, 0% RH at 75° F.

5. The GLBM catalyst was tested for ability to destroy carbon monoxide (CO) at 75° F. with 0% RH. It was found that the GLBM catalyst destroyed almost no CO under dry or humid conditions. Noble metal (GLPM)

catalyst on alumina powder was added in the proportion 50% GLBM, 50% GLPM. FIG. 5 shows that under dry conditions, at a space velocity of 265,000 hr$^{-1}$, with 500 ppb ozone and 10 ppm CO, a mixture of 50% GLBM and 50% GLPM destroyed 88.76% ozone and 9.52% CO.

To improve the CO destruction efficiency, an absorber was coated over the washcoat. It was found that % CO destruction was increased from 9.52% with no absorber to 42.48% with absorber. A solution of 1% $K_2CO_3$ was used to coat the catalyst piece. Solutions of 5% and 10% $K_2CO_3$ were also used to coat pieces and were expected to give better % CO destruction efficiencies than 1% $K_2CO_3$. The results in FIG. 5 show that they did not. The most effective was 1% $K_2CO_3$. The higher percentages of $K_2CO_3$ may have masked the catalyst causing a reduction in % CO efficiency. The presence of $K_2CO_3$ did not have significant effect on % $O_3$ destruction. Percent $O_3$ destruction was reduced from 88.75% to 85.83% with 1% $K_2CO_3$, to 82.22% with 5% $K_2CO_3$, and to 84.62% with 10% $K_2CO_3$.

Figure 6:
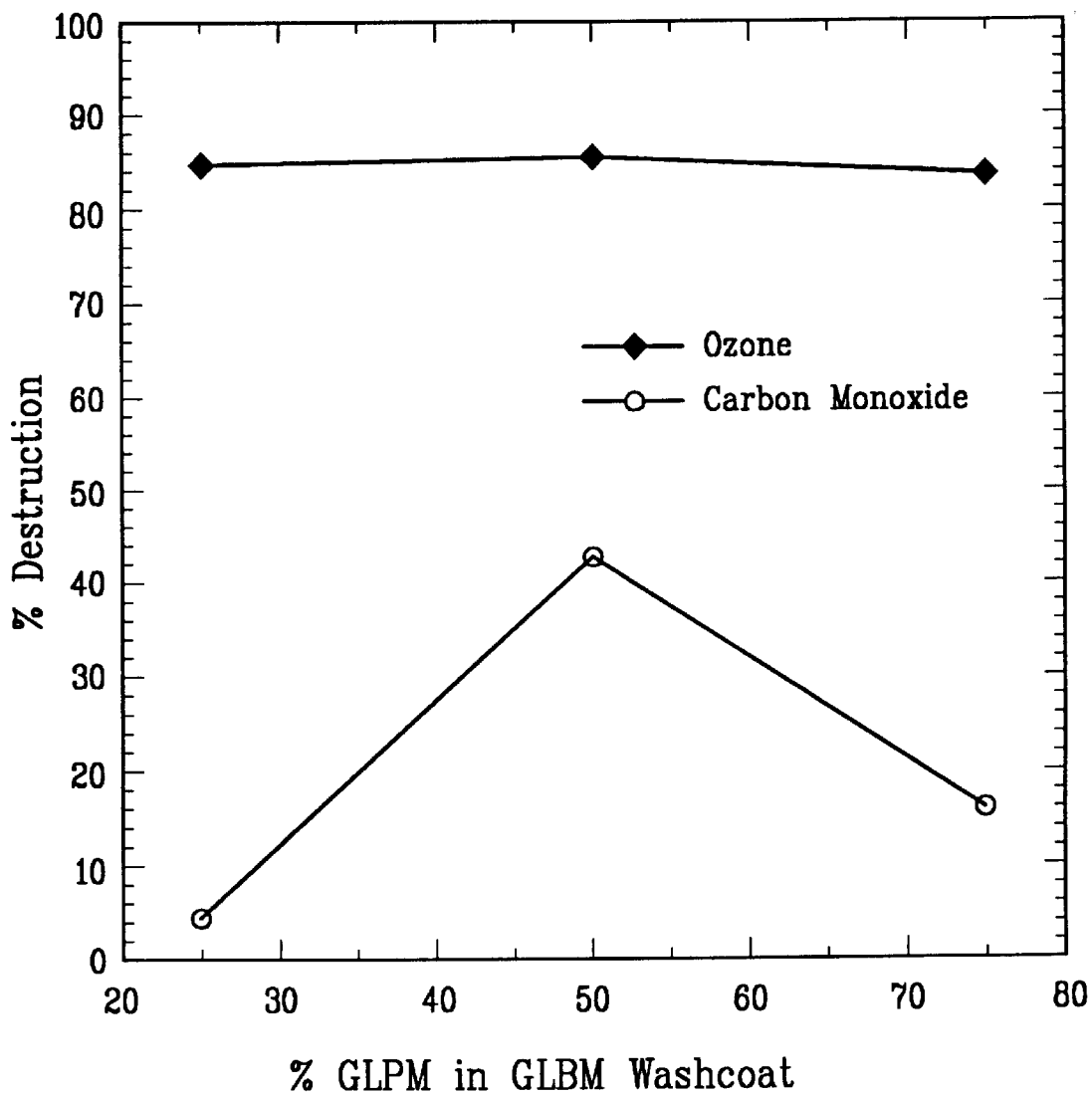
FIG. 6 is a graph comparing CO and ozone destruction at various levels of Mn/Cu and Pt deposited on 400 cpsi carrier with 1% $K_2CO_3$ absorber—300,000 hr$^{-1}$ vapor hourly space velocity (VHSV), 10 ppm CO, 500 ppb ozone at 75° F.

The percentage of GLPM in the washcoat was also varied. The results are given in FIG. 6. 50% GLPM, 50% GLBM gave the best results for % CO destruction.

6. The 50% GLBM, 50% GLPM with 1% $K_2CO_3$ sample previously tested for % CO destruction was tested again both dry and with 69% RH. The % CO destruction result under dry conditions was much less than when previously tested—3.63% vs. 42.48% at the earlier date. A sample with the same loading of the same washcoat was also retested at 261,000 hr$^{-1}$ space velocity and found to destroy only 8.62% of the CO present. This sample was then washed with 0.5% acetic acid, rinsed with deionized water, fired for 15 min. at 300° C. and recoated with 1% $K_2CO_3$. The sample then destroyed 50.5% of the CO under dry conditions at 326,000 hr$^{-1}$ space velocity. Washing and firing the sample at 300° C. brought back the previous level of % CO destruction. This sample was tested with 69% RH and the % CO destruction decreased to 4.0%. Water vapor has a dramatic negative effect on the efficiency of the GLBM/GLPM catalyst.

Figure 7:
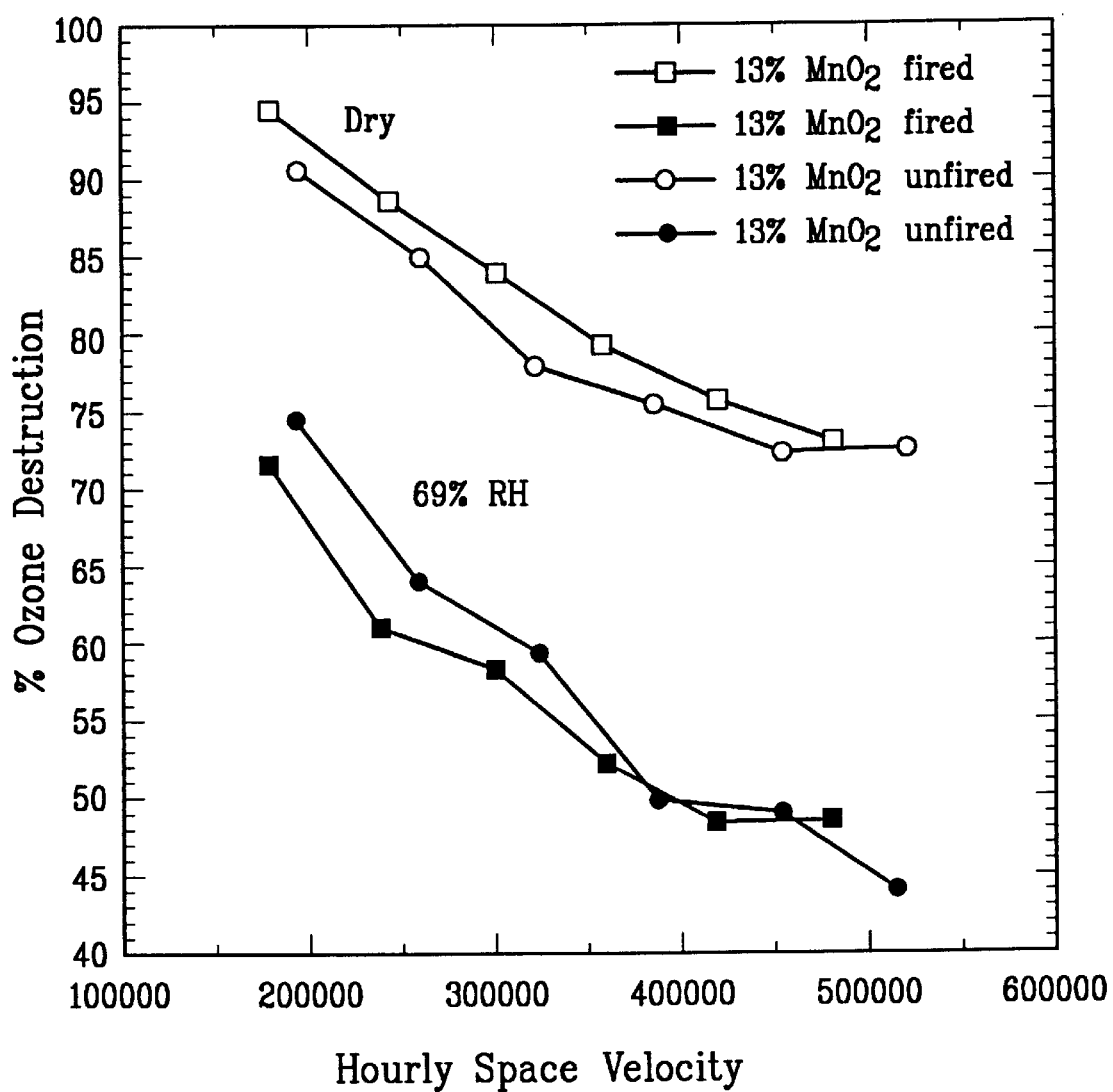
FIG. 7 is a graph comparing the effect firing the Mn/Cu coated carrier on ozone destruction—400 cpsi carrier with 1.91 g./in$^3$ Mn/Cu, 500 ppb ozone at 75° F.

7. The effect of firing the honeycomb after it is washcoated was tested by cutting 2 samples from the same 400 cpsi block washcoated with 1.91 g/in$^3$ GLBM catalyst (13% $MnO_2$, 3% CuO). The block had been dried at 125° C. One sample was tested unfired and the other was fired at 300° C. for 15 minutes. Firing the sample removes interstitial water, acetic acid and other volatile compounds. The samples were tested dry and with 69% RH with 500 ppb ozone at 75° F. FIG. 7 shows that the fired sample tested dry gave 84% $O_3$ destruction at 300,000 hr$^{-1}$ VHSV. The unfired sample, tested dry was 81% $O_3$ destruction at 300,000 hr$^{-1}$ VHSV. When tested with 69% RH, the trend reverses and the unfired sample is better than the fired sample, 61% versus 59% $O_3$ destruction at 300,000 hr$^{-1}$.

EXAMPLE 2

230 g of GLBM washcoat was made by applying 12.5 g $KMnO_4$ and 9.5 g $Cu(NO_3)_2 3H_2O$ in 50 g deionized water to 100 g Puralox SCF a-160 alumina powder by the method of incipient wetness. The powder was dried at 125° C., treated with 50 g of 10% sucrose and dried at 125° C. again. Another 12.5 g $KMnO_4$ and 9.5 g $Cu(NO_3)_2 3H_2O$ in 50 g deionized water was applied, the powder dried at 125° C. The powder was milled in a ceramic mill with 100 g 7% acetic acid for 8 hours. 75 g of 7% acetic acid was added to recover and dilute the washcoat to a specific gravity of 1.32. The pH was 4.16. The dried coating was 13% $MnO_2$ and 6.1% CuO. A sample was made by dipping a preweighed 400 cpsi piece in this washcoat. The excess was blown off with compressed air and the sample was dried at 125° C. The sample was reweighed and the washcoat loading was 1.19 g/in$^3$. The results of the ozone destruction test are given in FIG. 1.

EXAMPLE 3

Figure 8:
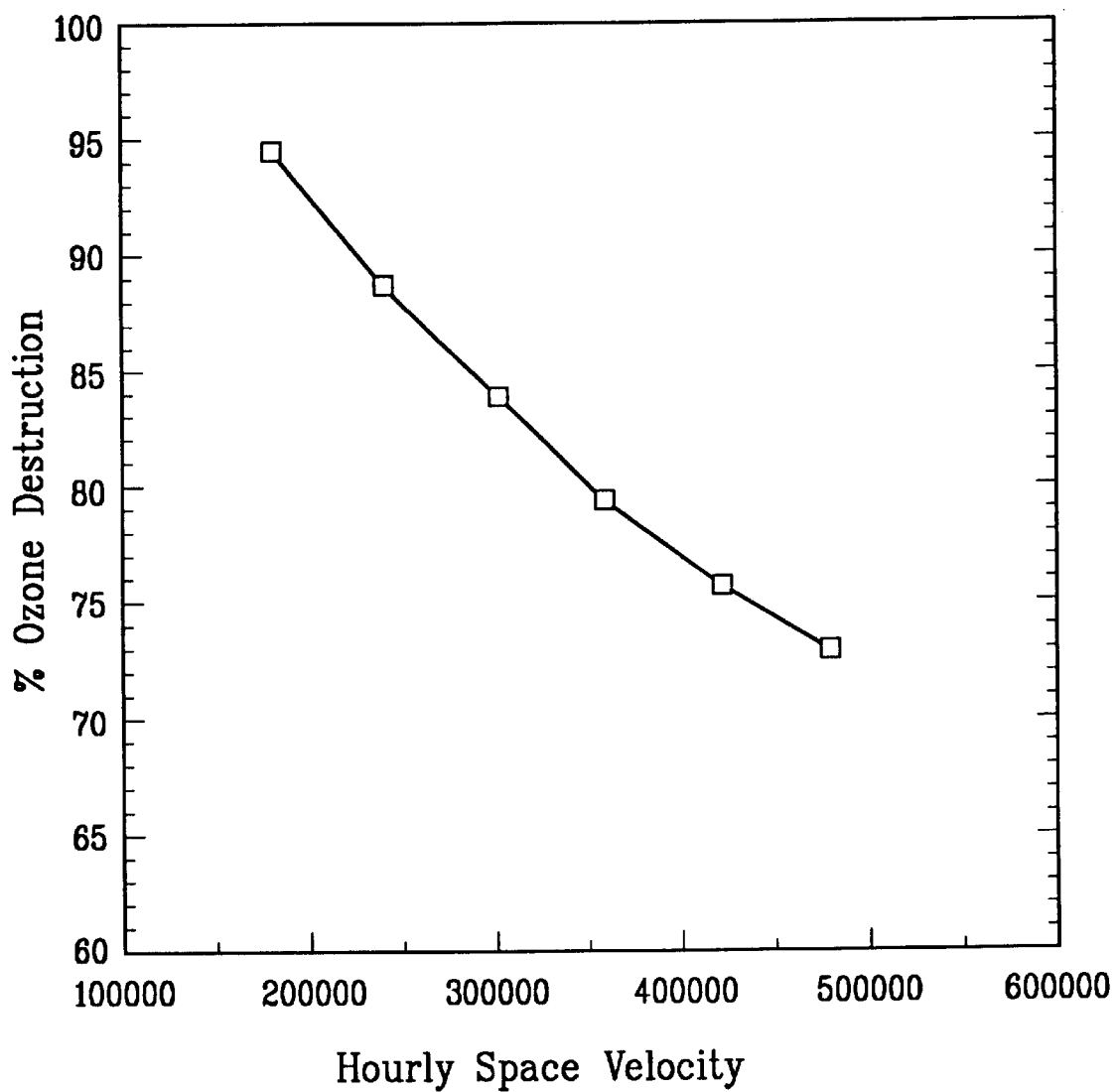
FIG. 8 is a graph showing the effect of VHSV on ozone destruction for 1.91 g./in$^3$ Mn/Cu deposited on 400 cpsi carrier—500 ppb ozone at 75° F.

204 g of GLBM washcoat was made by applying 15.0 g $KMnO_4$ and 4.95 g $Cu(NO_3)_2 3H_2O$ in 50 g deionized water to 100 g Puralox SCF a-160 alumina powder by the method of incipient wetness. The powder was dried at 125° C., and reduced in the oven while being heated overnight. Treatment with sucrose was not necessary. Another 15.0 g $KMnO_4$ and 4.95 g $Cu(NO_3)_2 3H_2O$ in 50 g deionized water was applied, and the powder dried at 125° C. The powder was treated to the point of incipient wetness with 15 g of formic acid diluted to 50 g with deionized water. After drying at 125° C., the powder was washed 1 time with 1% acetic acid, rinsed 2 times with deionized water and dried at 125° C. again. The powder was milled in a ceramic mill with 124 g of 7% acetic acid for 8 hours. 40 g of 7% acetic acid were added to recover and dilute the washcoat to a specific gravity of 1.38. The pH was 4.65. The dried coating was 13.0% $MnO_2$ and 3.0% CuO. A sample was made by dipping a preweighed 400 cpsi piece in this washcoat. The excess was blown off with compressed air and the sample was dried at 125° C. The sample was reweighed and the washcoat loading was 1.19 g/in$^3$. The results of the ozone destruction test are given in FIG. 8.

EXAMPLE 4

Figure 9:
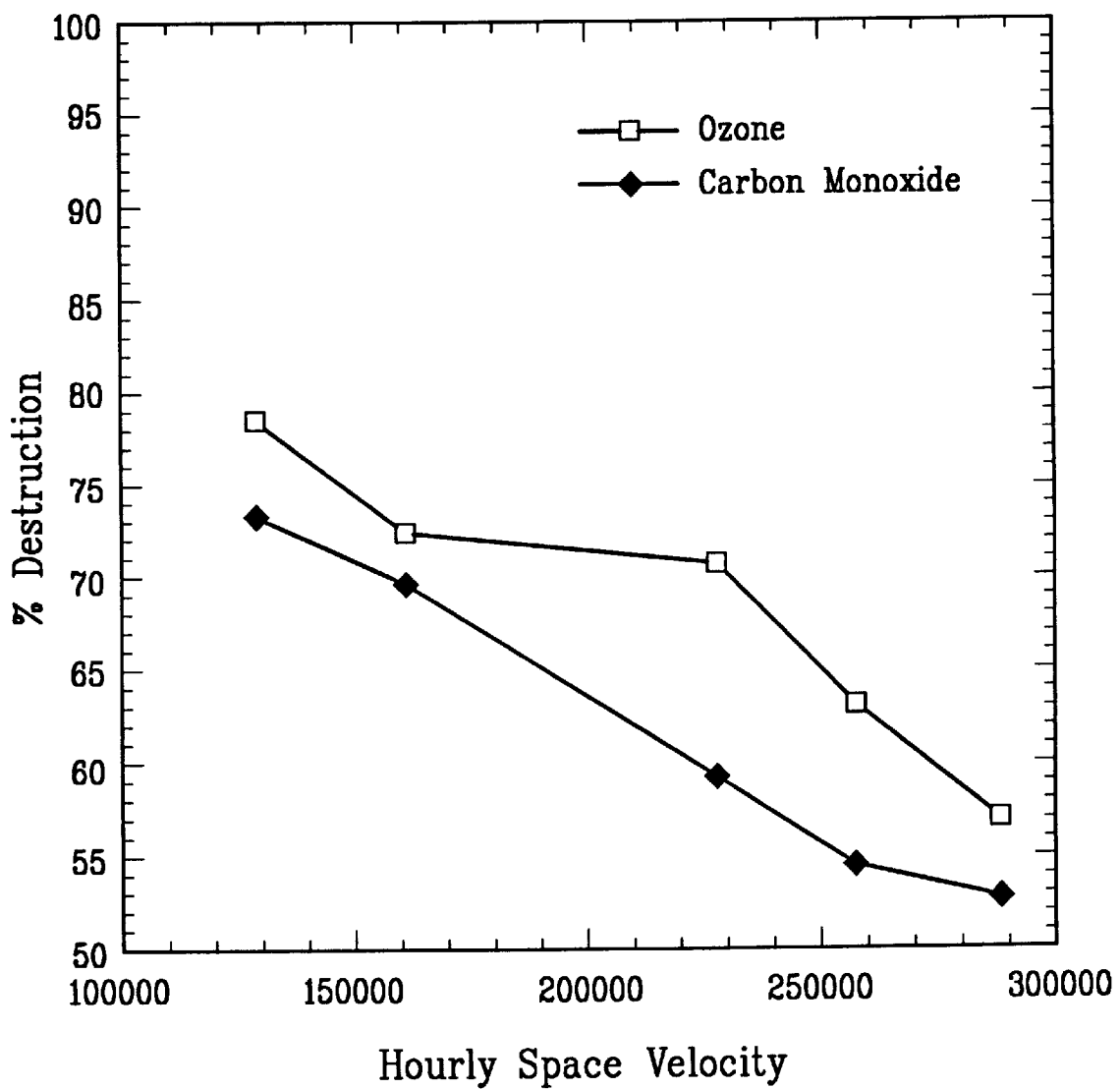
FIG. 9 is a graph showing the performance of only Pt catalyst on CO and $O_3$ removal at various VHSV—400 cpsi monolith, 1.3 g/in$^3$ alumina, 46 g/ft$^3$ Pt, 400 ppb $O_3$, 10 ppm CO, 69% RH at 75° F.
Figure 10:
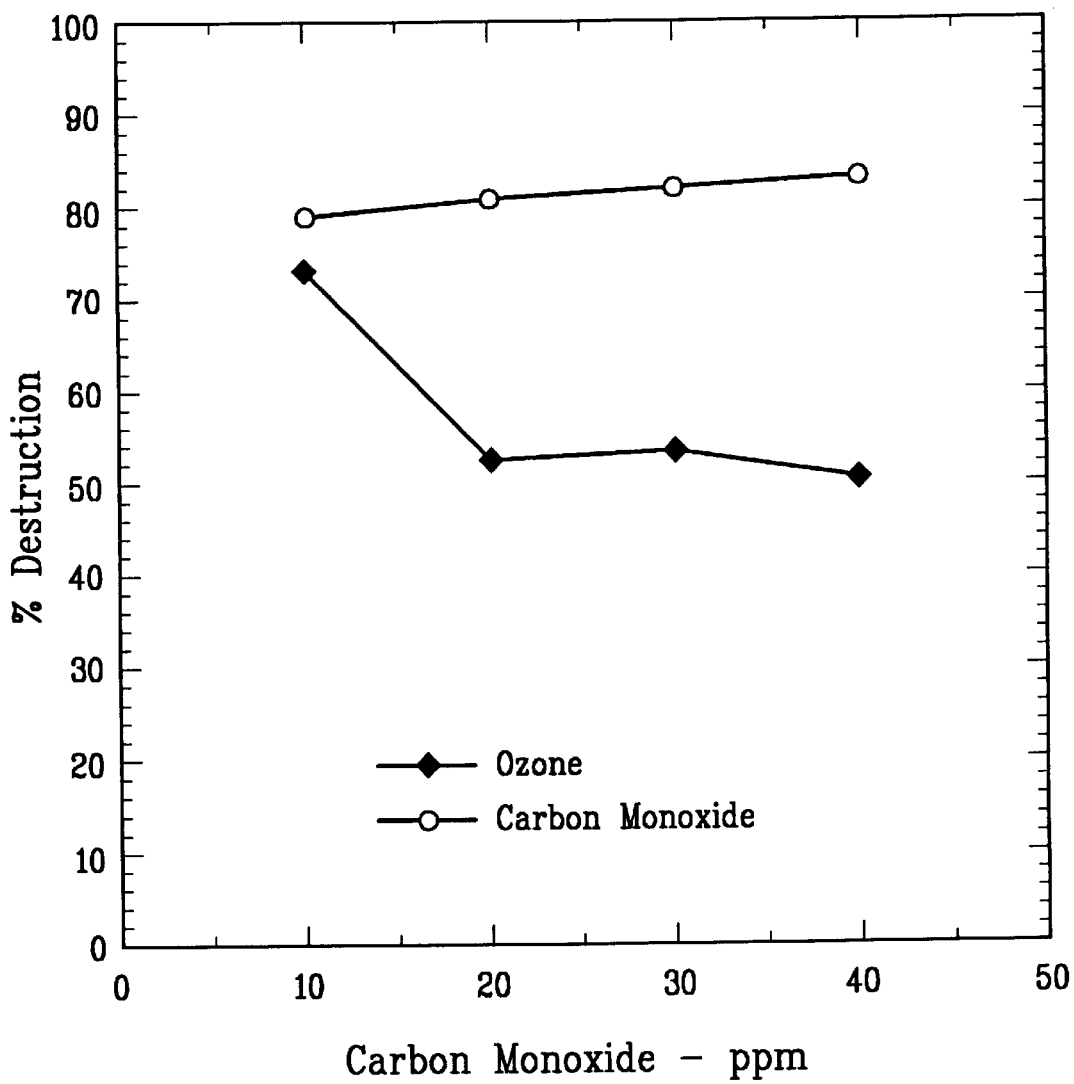
FIG. 10 is a graph showing the performance of only Pt catalyst on $O_3$ at different levels of CO—400 cpsi monolith, 1.3 g/in$^3$ alumina, 46 g/ft$^3$ Pt, 500 ppb $O_3$, 69% RH at 75° F.

In an effort to increase CO destruction, a sample was made with alumina washcoat without the precious metal component added. A 400 cpsi piece was dipped in this washcoat (1.3 g/in$^3$), the channels blown clear with compressed air, and the piece fired at 500° C. for 30 minutes. The sample was dipped in a 1.94% $Pt(OH)_6$ solution, dried at 125° C. for 10 minutes and fired at 500° C. for 10 minutes. This gave a Pt loading of 46 g/ft$^3$. The sample was tested without an absorber coating. FIG. 9 shows that firing at 500° C. greatly improves the GLPM catalyst's ability to oxidize CO. FIG. 10 shows that increasing the CO concentration gives slightly improved ozone destruction and that CO destruction is not significantly affected.

EXAMPLE 5

A coating was made by mixing log of GLBM coating from Example 1 with 15 g of washcoat suspension made as GLPM washcoat but without the precious metal component added. This gave a mixture that was 40% GLBM coating. A 400 cpsi piece was coated with the mixture, the channels cleared with compressed air, and the piece fired at 500° C. for 30 minutes. The piece was dipped in a 1.9% $Pt(OH)_6$ solution for 5 seconds and the channels again cleared with compressed air. The piece was dried for 10 minutes at 125° C. and fired at 500° C. for 30 minutes. This gave a Pt loading of 46 g/ft$^3$. The piece was tested without an absorber coating. The piece was tested with 500 ppb ozone and 10 ppm CO. At a space velocity of 161,000 hr$^{-1}$ and 54% RH, $O_3$ destruction was 93.77% and CO destruction was 45.37%. At a space velocity of 229,000 hr$^{-1}$ and 54% RH, $O_3$ destruction was 90.20% and CO destruction was 41.67%. Increasing relative humidity to 60% at 229,000 hr$^{-1}$, $O_3$ destruction was 84.06% and CO destruction was 30.00%. Increasing the CO concentration to 20 ppm at these conditions did not change the CO or $O_3$ destruction.

What is claimed is:

1. A method of removing ozone from air comprising passing air containing ozone through a catalyst system consisting of a catalyst component consisting of a combination of 2–50 wt. % manganese component, 1–40 wt. % copper component and a high surface area alumina powder support, said catalyst component being applied as a washcoat to a macroporous carrier wherein the catalyst component comprises 5 to 20 wt. % of the total weight of the carrier and catalyst component or consisting of a combination of 2–50 weight % manganese component, 1–40 weight % copper component, from 0.1 to 20 wt % of a noble metal component measured as metal and a high surface area alumina powder support, said catalyst component being applied as a washcoat to a macroporous carrier wherein the catalyst component comprises 5 to 20 wt. % of the total weight of the carrier and catalyst component and said catalyst system is coated with a carbonate absorber.

2. The method according to claim 1 wherein said manganese component is 2 to 50 weight % of the catalyst component and said copper component comprises 21 to 40 weight % of the catalyst component.

3. The method according to claim 1 wherein the manganese and copper components are present as oxides or hydroxides.

4. The method according to claim 1 wherein said carrier comprises macroporous ceramic or metal foam.

5. The method according to claim 1 wherein said carrier comprises macroporous ceramic monolith.

6. The method according to claim 1 wherein said carrier comprises macroporous honeycomb cordierite.

7. The method according to claim 1 wherein said catalyst component consists of a combination of a manganese component, a copper component and a platinum component.

8. The method according to claim 7 wherein said platinum is from 0.1 to 20 wt. % of the catalyst component measured as the metal, said platinum component being 0.1 to 5.0 wt. % of the total weight of the carrier and added components.

9. The method according to claim 1 wherein said catalyst component consists of a combination of a manganese component and a copper component.

* * * * *